United States Patent
Acker

[15] 3,684,867
[45] Aug. 15, 1972

[54] APPARATUS FOR READING RANDOMLY POSITIONED DATA

[72] Inventor: Norbert Karl Acker, Falltorweg 5, 6079 Buchschlag, Germany

[22] Filed: July 15, 1970

[21] Appl. No.: 55,006

[52] U.S. Cl. ........................235/61.11 E, 250/219 D
[51] Int. Cl. ............................................G06k 7/015
[58] Field of Search ...340/146.3; 235/61.11, 61.115, 235/61.111; 250/219 Q

[56] References Cited

UNITED STATES PATENTS 3,246,126 4/1966 Schlieben et al. ......235/61.11
3,414,731 12/1968 Sperry.......................250/219
3,408,483 10/1968 Zuse.......................235/61.11

*Primary Examiner*—Thomas A. Robinson
*Attorney*—Smyth, Roston & Pavitt

[57] ABSTRACT

Randomly oriented data fields with linear tracks are imaged, and the image is aligned for movement in direction of track image extension, during which movement the track images are read bidirectionally, the resulting readout signals being assembled, decoded and tested.

24 Claims, 10 Drawing Figures

INVENTOR:
Norbert Acker
By Smyth, Roston & Pavitt
Ralf H. Siegemund
ATTORNEYS

INVENTOR:
Norbert Acker
By Smyth, Roston & Pavitt
Ralf H. Siegemund
ATTORNEYS

INVENTOR
Norbert Acker
By Smyth, Roston & Pavitt
ATTORNEYS

APPARATUS FOR READING RANDOMLY POSITIONED DATA

The present invention relates to a device and apparatus for machine reading of information having random position and/or random orientation when passing through or placed within a particular area. In my copending application, Ser. No. 788,302, I have proposed a system according to which an image of a data field having such random position and orientation is provided. Through lateral as well as rotary shifting of the relative position between data field reading elements and the data field image the latter is particularly disposed in relation to the data reading elements to obtain proper data field readout position. It is obviated thereby to handle the data field carrier for the reading process. It is in particular obviated thereby to provide special equipment for causing the data field carrier to move past the readout equipment in a particular orientation, as it is impractical to provide orientation of the data field carrier itself through handling and position control thereof. The present invention now relates to improvements of the system and develops the basic concept as shown in the copending application.

The apparatus in accordance with the present invention is related particularly to the reading of data fields in which data are defined by optical contrast producing markings arranged along one or several, parallel, linear tracks, whereby recognition marking is provided for defining the extension of that track. Conveniently, the data field may be a rectangular label or the like with at least one of the long sides of the rectangle establishing that recognition marking, and the data track or tracks extend parallely to that long side of the rectangle. In the preferred configuration the data field label is provided with a fluorescent surface, and the information markings thereon are dark, black or of complementary color.

An item bearing such a label may appear in a particular area at random positions and/or random orientation therein. That particular area is now illuminated with radiation that is poor in the frequency of the particular fluorescent line of the fluorescent material of the label but is sufficiently strong at, usually, shorter wavelengths. In addition, the illuminating radiation is a pulsating one to provide a particular subcarrier modulation. Reflections from the observation area are observed as radiation directed away from the illuminating source, and that reflected radiation is filtered to restrict reception of radiation to frequencies of the florescent line. That line frequency is, in effect, a carrier, modulated by pulsations as subcarrier. This filter then is in effect an optical carrier discriminator. Suitably disposed detectors to be described below have their output signals processed to restrict response or circuitry connected thereto to signal components having the pulsating subcarrier frequency.

An optical path is defined between the observation area and the photoelectric detectors which includes imaging elements such as optical elements and/or electron optical elements and further elements which provide rotation of the resulting image as well as lateral image deflection in two, preferably perpendicular, directions in the imaging plane. By operation of deflection and rotation the randomly positioned and/or oriented data field image can be particularly positioned and oriented.

Desired orientation and position of a data field image is now chosen so that the long side of the image of the data field rectangle, or speaking more broadly, of a linear recognition marking running parallel to the data track extension, runs parallel to one of the directions of lateral image deflection. Lateral deflection of the image in the other (transverse) direction as well as rotational movement thereof, provides for relative positioning of the data field image along a particular line and in particular relation to a data read detector. The data field image is caused to oscillate for data reading, and along that particular line, so that the track images pass over the data read elements.

The image positioning control is preferably provided by the outputs of a plurality of detector cells arranged in the image plane along a particular line. Control as far as rotation and lateral shifting transverse to that line of image reading is concerned, orients one of the long sides of the data field image rectangle to coincide with that line. The readout motion of the image is then carried out by moving the data image along that line and along suitably displaced data read elements. Readout signals result as amplitude modulation included in the signals detected by the read elements (at subcarrier frequency). The amplitude modulation is produced when sequentially images of dark markings and of fluorescent background labeling pass the read elements.

Particular markings are provided to distinguish beginning and end of the information on a data field. Electric circuitry is provided for responding to signals representing the distinguishing markings to properly assemble the data which have been read from the data field image as it passed over the data read elements.

Electronic circuitry is now provided to permit proper assembly of data regardless of whether the label has been imaged right side up or upside down. The readout signals are set into two different register means regardless of the direction of motion of the data field image across the data detector elements, but only one of the register means will retain the data if the beginning or end distinguishing markings precede the data proper, while the other register means will retain data set into it when beginning or end distinguishing marking succeeds the data proper. Therefor, a data field is read twice, once in each direction, and regardless of direction and of sequence of filling the two register means. After a complete back and forth motion cycle of the data field image across the data read elements, read errors can more easily be detected and compensated for, if the data field has been read at least once in each direction.

It should be observed, that a small misalignment of the data field image introduces a skew effect which, in conjunction with image distortions, may produce read errors, particularly of the kind which is not detectable if the readout result, though erroneous as to data still meets format requirements. Double reading in different directions when resulting in agreement of the assembled data is unlikely to result in complementary errors, so that after several back and forth cycles of image motion, a pair of similar and therefore errorless completed readout signals are available.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 5:
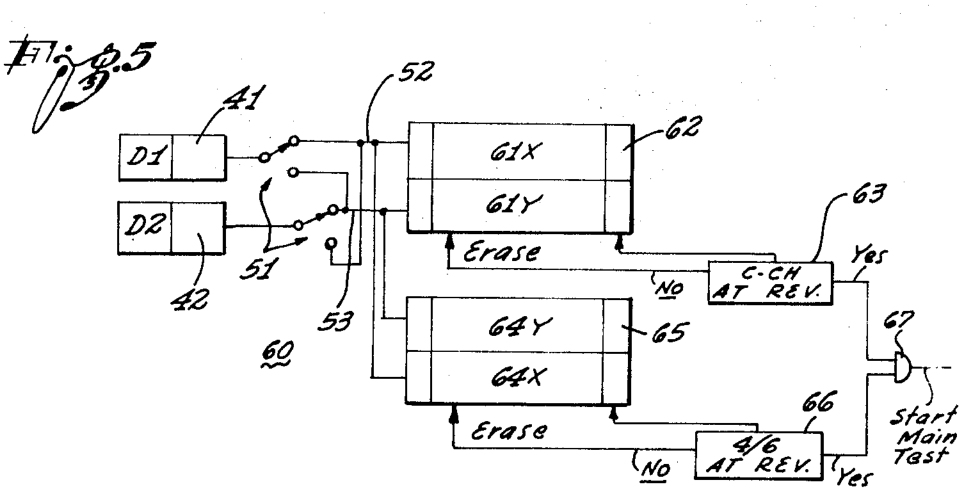
FIG. 5 illustrates somewhat schematically a block diagram for processing of read-out signals as read with the equipment in FIG. 1.
Figure 5A:
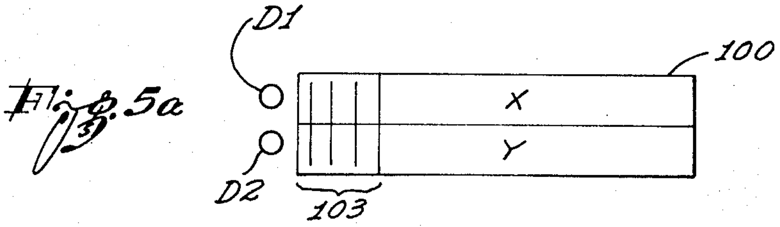
Figure 5B:
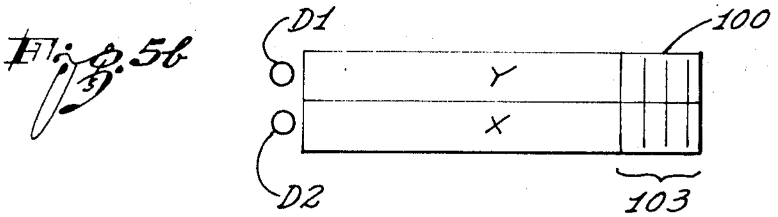
Figures 6, 7, 8:
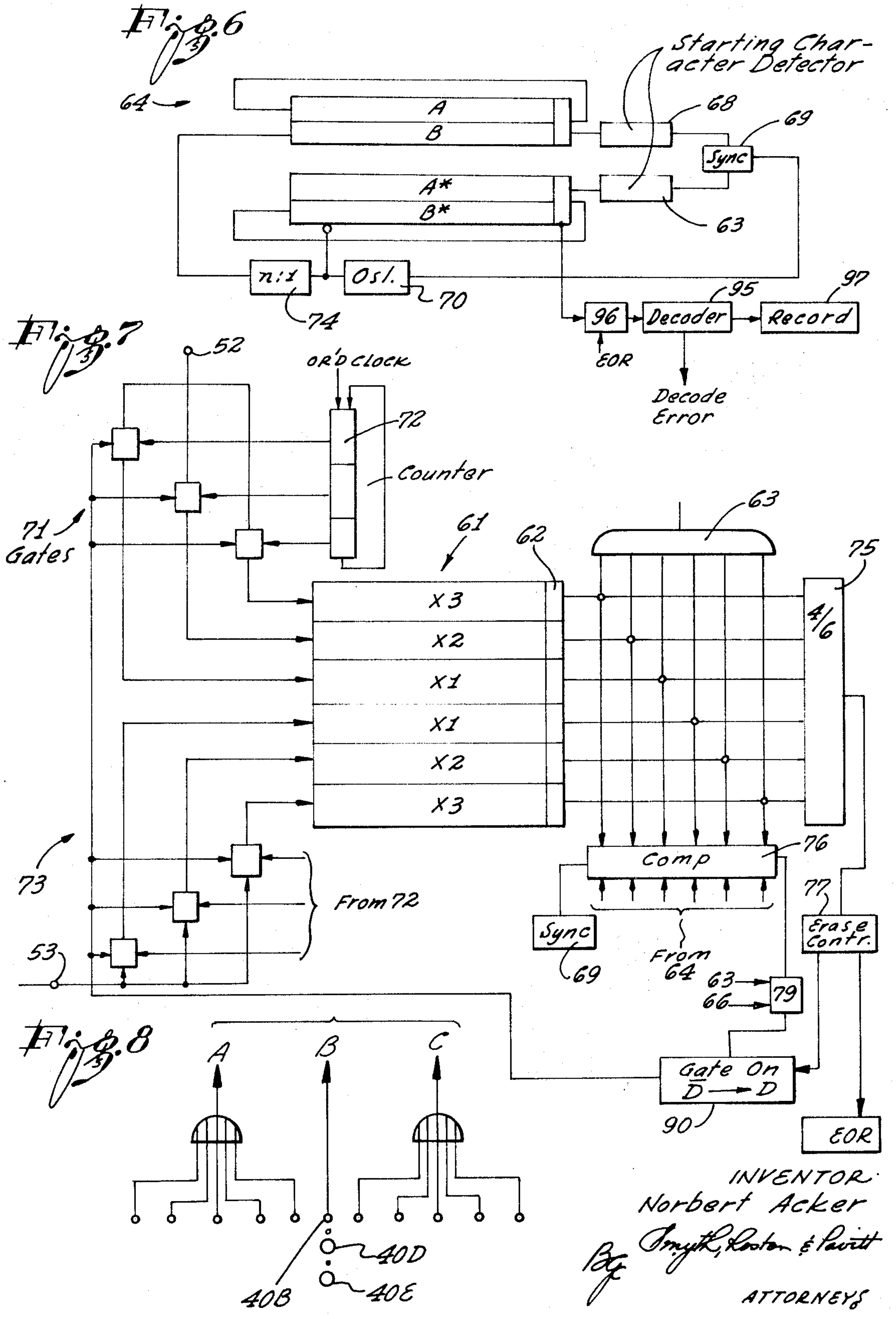

FIGS. 5*a* and 5*b* illustrate two different relative positions between read-out cells and data field image;

FIG. 6 illustrates a block diagram of a detail of the data signal processing circuit;

FIG. 7 illustrates a block diagram included in the data signal processing circuitry; and FIG. 8 illustrates a modification of the recognition and detector cell arrangement.

Figures 1, 2:
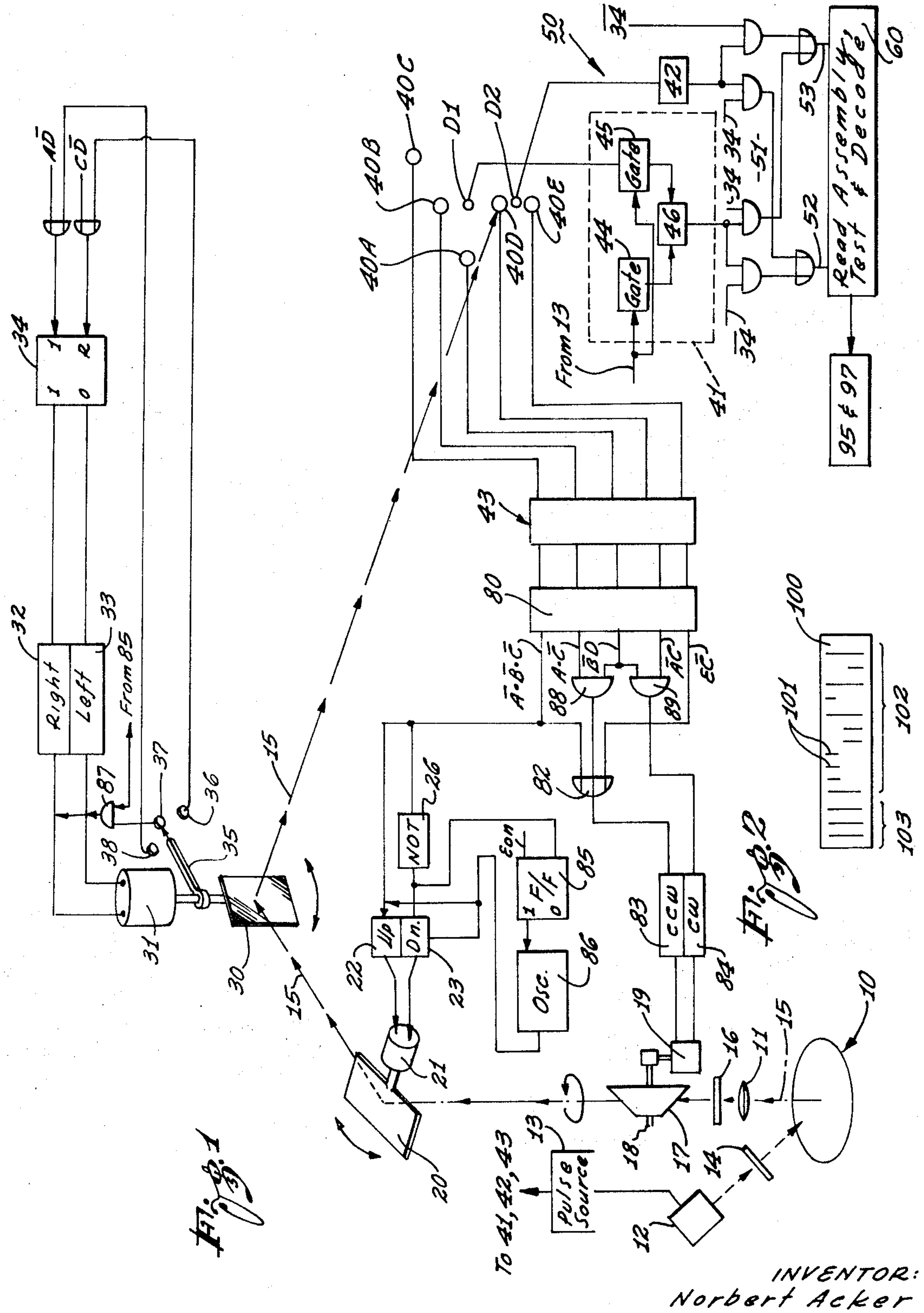
FIG. 1 illustrates schematically partially as block diagram, partially as schematic view an apparatus in accordance with the preferred embodiments of the invention.
FIG. 2 is a top view of a schematic representation of a data field processed in the equipment of FIG. 1.

Proceeding now to the detailed description of the drawings in FIG. 1 thereof there is illustrated a system in which the preferred embodiment of the invention is practiced with advantage. Reference numeral 10 denotes an area in which a particular data field may appear at random position and/or random orientation. In the following, area 10 will also be called search, observation or inspection field or area.

The data field is of the type illustrated in FIG. 2 and is comprised of a rectangle 100. Such a data field may be a label which has been affixed to an item of merchandise. In essence, the label may have a background coloring of strongly fluorescing material radiating predominantly light of a particular frequency and color, particularly upon being illuminated with radiation having shorter wavelength than the fluorescent line. Therefore, an area illuminated with light rich in the particular fluorescence wave-length of such a label still will reflect that radiation, if at all, to a lesser degree than the label itself. This was found to be true even for polished surfaces other than the lable. Such a label when attached to conventional packaging for merchandise will appear considerably brighter than the merchandise, at least as far as light in the fluorescing color is concerned. This holds true also if the item merchandise so labelled, is placed in any environment devoid of similar fluorescing substance. In order to enhance transition contrast fluorescent label 100 may have a black border.

Such a label or field bears data representing markers 101 disposed on the field or label in a format and arrangement as will be explained below. Presently it is sufficient to point out that these markers provide optical contrast to the background. Thus the markers are, for example, printed on the label in black or in the complementary color, preferably without fluorescence.

Reading of the data field as well as optical detection of its position in the inspection or search field 10 requires optimum discrimination against disturbances and particularly against parasitic reflections from within field 10. This discrimination is provided as follows. A source 12 of radiation illuminates field 10 with radiation of shorter wavelength than the principal fluorescent line of a data field background. It is presumed for the sake of convenience that antistokes fluorescence is not involved, but the system could be adapted to this abnormality.

As schematically indicated by block 13 the light source as a whole is controlled to provide pulsating light at a particular pulse frequency. The generation of light itself may be pulsed at that frequency, or a continuously radiating source is provided with a light chopper. Generally then the block 13 can be regarded as a source for oscillating, pulsating signals of a suitable type provided for the purpose of generating light pulsations. These pulsations are provided as a subcarrier frequency.

As a precautionary measure there may be provided a filter 14 with sharp cut-off to eliminate from the beam that emanates from source 12, radiation of the fluorescent frequency itself so that any nonfluorescent object incidentally located in the inspection zone 10 and which happens to have the same color as the label, will receive little radiation of that color, there will be no parasitic for reflection accordingly. Filter 14 may not be needed if source 12 is already poor in light having frequency of the fluorescent line of the label coloring. The illumination for inspection field 10 is thus characterized (a) by particular pulsating (subcarrier) frequency which, of course, is much lower than the light frequency involved and (b) by a low content of light of the fluorescent line (carrier) frequency.

The inspection field is observed by optical equipment disposed along an optical path and which includes the optical axis 15. This equipment will be described in detail below, presently reference is made only to the end of that optical path which is established by a screen or the like and includes a plurality of photoelectric detectors 40A through 40E as well as detectors D1 and D2. It is also important presently that the optical path includes a filter 16 disposed anywhere along axis 15, between inspection field 10 and the photoelectric detectors.

This filter 16 is the complement to filter 14. The filter 16 must pass the light of the fluorescent line used and it should cut off as much as possible any or all of the shorter wavelength from the source 12. Filter 16 can thus be an optical lowpass or a band or line filter. The filter is in effect an optical carrier frequency discriminator, the carrier frequency being the fluorescent line frequency. This way light reaching the photoelectric detectors is restricted to a considerable degree to radiation resulting from fluorescence and from no other source.

In order to discriminate against reflection from similarly colored reflective or white objects illuminated by ambient light and appearing for one reason or another in inspection zone 10, the pulse modulation (subcarrier) must be detected. This detection can be carried out by frequency discrimination and tuned electrical circuits, processing the electric output signal as provided by the photoelectric detectors. However, in the preferred embodiment it is suggested to proceed as follows.

The detectors D1 and D2 are connected individually to gated amplifier systems 41 and 42 respectively. The detectors 40A through E are individually connected to similar amplifiers collectively denoted with reference numeral 43. These gated amplifier systems are provided with dual channels such as channels 44 and 45 of amplifier system 41. The channel 44 is controlled by the pulse controller 13, to be opened when the controller inhibits light from source 12 while channel 45 is closed during these periods. Channel 44 is closed when controller 13 causes source 12 to emit light, but it has holdover characteristics, to hold its output from the preceding gated open state until that output is updated with reopening of channel 44. Thus, channel 45 is open when channel 44 is closed and holds its previous output. A threshold detector 46 interconnects the outputs of channels 45 and 44 to determine whether the difference in outputs of channels 44 and 45 exceeds a minimum threshold difference value.

The output of channel 44 when gated open represents ambient light and parasitic reflections entering the system, as source 12 is cut off during the period that channel 44 is open. The resulting output represents "pure noise" and is in fact subtracted from the output of channel 45. The threshold detector 46 determines whether the resulting difference exceeds a particular threshold. Such a signal, and only such a signal, is recognized as representing information in the general sense. This arrangement provides for the subcarrier detection of the system. As will be described later in this specification, data reading involves passing the image of a data label under and along cells D1 and D2, and the data proper will then result from an additional amplitude modulation of this subcarrier output, the amplitude varying from the level resulting from reflection of the dark markers to the level of fluorescent label portions when passing the cells D1 and D2.

The threshold detector outputs of the respective circuits 43 are rectified and used as logic signals. The amplitude modulation is generally indicative of the label image position. In the illustrated circuit the rectified output of the several channels 43 (i.e., of the threshold detectors therein) establish the position control signals A, B, C, D and E.

As stated, the principal purpose of a label 100 is to establish a (physical) data carrier. Additionally, the long sides of the rectangular label define the extension of the tracks thereon. The data are recorded on this carrier as dark contrasting markers 101, arranged for example in two data tracks, in the following denoted X and Y. The data markers extend transversely to the long sides of the rectangular label and to the tracks. These markers may be oriented serially along a track whereby each marker defines a bit value as well as a bit position. For each marker in a track there may be another marker in the parallel bit position in the respective other track, while absence of such a marker designates a bit of opposite value. Absence of markers in both tracks designates a gap, i.e., data bit positions require at least one marker in one track.

The system presently described does not rely on nor requires a particular encoding. Generally the data to be recorded in a data field may be encoded as two-bit-characters in parallel by bit, serial by character format. However, a particular encoding format is disclosed for example in my copending application Ser. No. 818,030, filed Apr. 21, 1969. This application discloses a character encoding also called three-out-of six or four-out-of-six wherein each character requires three serial bits in each track. The resulting six bit character must have three or more markers. More generally, a character has serially arranged subcharacters, a subcharacter being comprised of two parallel markers or one marker in a bit position, while the respective parallel bit position is vacant.

Data proper fill an area 102 of the label, the data bits being arranged to comply with the chosen format requirements. Between, in the drawing, the left hand margin of the data area 102 of each track and the left hand margin of the label there is a control character characterized for example by three markers in each track, i.e., the control character is a six marker bit character (or three subcharacters each having two marker bits). The format of that control character is arbitrary but it should be outside of the format used for encoding data proper, so that it can be recognized as a control character. In other words the control character may be a particular illegal character when compared with the bit combinations permissible for data encoding. On could also use a data gap having width larger than the bit spacing on each track in the data field proper 102.

The purpose of the control character or of the gap is to define the data orientation on the label. Looking at the label as a whole and looking at an individual track thereof in particular, one can see, that starting, for example, from the left the data on each track are preceded by bits pertaining to the control character (or by a gap) followed by data markers. The control character could be at the end of the data field, or two different control characters could be used, one for the beginning, one for the end.

The purpose of this control character is to provide directly recognizable representation of the beginning and/or end of data so that the data can be properly assembled. While it is optional, it is convenient to assume that the data are arranged to read from left to right. In that orientation, the beginning of data follows the control character while the end of data is directly adjacent one short side margin of the rectangular label. This distinction is important because if data were to fill the entire length of the label, recognition of beginning and end of information would require rather involved processing. For reasons of consistency it is therefore assumed in the following that the control character leads the data.

Returning now to FIG. 1, an item bearing a label of type shown in FIG. 2 may appear in observation field 10. There are different ways how this can occur. Generally speaking the observation field 10 is defined by the effective object size, and optical aperture of optical equipment arranged along optical axis 15, there being an object lens or lens system 11 serving as optical input element for that optical system. Lens or lens system 11 may be stationary so that observation field 10 has likewise stationary disposition. For in this case the data field labels are expected to move or to be moved into or through field 10 (and out again). For example, there may be provided a conveyor belt transporting items of merchandise and/or articles bearing such labels through a stationary observation region 10. For readout of the label the conveyor belt may stop, but the readout system actually permits and compensates for motion of the data fields through the observation field during reading.

In the alternative the scanning and observation field 10 may be a mobile one, i.e., the device containing lens or lens system 11 does not require stationary disposition. Lens system 11 may pertain to a displaceable read head which is placed on top of or over an item of merchandise, so that observation region 10 is "moved" to that data field. The illumination source 12, of course, must be displaceable with the optical input system 11. Thus, the observation and inspection field 10 could move with the equipment. In this case, lens or lens system 11 may be linked to stationary optical equipment positioned on axis 15 by means of flexible type fiber optics.

It is essential that regardless of whether observation field 10 is mobile or whether it is stationary, labels of the type illustrated in FIG. 2 may appear in observation field 10 at random orientation and/or random position within the particular confines as defined for example by the aperture of lens system 11 or by the illumination cone as defined by the effective aperture of source 12 or both. In other words even if the observation field 10 is set up by a displaceable system any particular physical adjustment, orientation and positioning of the data field in relation to axis 15 for purposes of readout is not required nor used.

Proceeding now to the description of the optical elements arranged along the optical path of axis 15 there is first provided a Dove prism 17 which is disposed in a proper holder 18 which in turn is geared or otherwise linked to a rotating transmission. The transmission is driven by a reversible motor 19. The Dove prism as driven by motor 19 rotates about optical axis 15. As a consequence of rotating the Dove prism, the optical system as defined by elements 11 and 16 provides a continuously rotating image of the data field 10 in an image plane along optical axis 15. That image plane may ultimately coincide with the target or screen 40, but there may be additional optical elements disposed between the exit side of Dove prism 15 and screen 40, so that the system operates with additional intermediate image planes. In either case, an image of the observation field as projected into the plane of screen 40 is caused to rotate due to the rotation of prism 17. Aside from the foregoing, the imaging process may involve production of intermediate images by way of electron optical equipment as mentioned in the above identified application. Presently the description is limited to straightforward optical means for the sake of convenience only.

The optical axis 15 and the imaging rays therealong are deflected by a first, pivotable mirror 20 coupled to a reversible motor 21 for pivoting the mirror 20. The imaging rays are deflected from their direction of initial propagation in such a manner that the image undergoes motion which in the following will be referred to as "up" and "down"; this designation has been chosen for reasons which will become apparent more fully below.

Next along the optical path and within a limited range of normal deflection there is provided another mirror, denoted with reference numeral 30 and being coupled to the driven output of a motor 31. Motor 31 is likewise of the reversible type and is used for pivoting mirror 30 over a certain limited range, so as to deflect the image in directions transverse to the deflection as provided by mirror 20. The deflection provided by mirror 30 will in the following be referred to as "back and forth" or "left" and "right" image displacement.

An image of the search and observation field 10 is finally produced onto screen 40. Screen 40 includes the particular assembly of photoelectric detectors introduced above and arranged in a particular pattern. The three photo cells 40A, B and C are arranged in a row, along a line, and they define therefore a particular direction on screen 40. This direction is parallel to or coincides with the direction of deflection provided by mirror 30 upon being pivoted about its axis. Thus, the image is moved by mirror 30 back and forth is along the line as defined by the three cells 40A, B and C. The up and down deflection of an image due to pivoting of mirror 20 occurs, therefore, transversely to that line of detectors.

Photodetector 40D is provided below detector 40B and at a distance therefrom which is about half the length of the short side of an image of a rectangle 100. Another detector, denoted 40E, is provided underneath detector 40D and at a distance from detector 40B which is larger than the short side of the image of the label rectangle but smaller than the long side thereof. The detectors 40A, through E are provided as input elements for the purpose of position control of the image of the label as projected onto screen 40 by operation of the optical equipment along axis 15. The photodetectors D1 and D2 serve as data readout cells for reading the data marker images particularly after the image of a data field label has been positioned so that one of its long sides coindices with the line defined by the cells 40A, B and C. The two cells D1 and D2 straddle cell 40D.

It should be mentioned that the detector 40D may be eliminated, and the output signals of detectors D1 and D2 could be used instead, in a logic "or" configuration. However, it may be advantageous to separate completely the label image positioning and orienting logic circuit from the data read logic and circuit.

The pulsating output signals of the photocells 40A, B, C, D and E are processed in the channels 43 as to subcarrier demodulation resulting in demodulated output signals A, B, C, D and E, whereby a signal A, for example, defines detection of fluorescent light from a label while $\bar{A}$ defines absence thereof. These logic signals are processed in a logic circuit 80 shown as a block, but the logic circuit includes additional gates shown in detail. The function of this logic circuit generally is to process the output signals A, B, C, D and E for controlling the position of Dove prism 17, and of mirror 20 30 so that the image of the data field oscillates by operation of mirror 30 in a direction colinear with the extension of the data tracks and underneath readout cells D1 and D2. The data read signals as then read by cells D1 and D2 are processed in a circuit 50. Details will be described more fully below.

Generally the operation of the system distinguishes among three phases. The first phase can be called a search phase wherein the optical equipment and the elements providing variable direction and orientation for image deflection are operated and controlled by the detector cells to determine whether there is a data field in the inspection field. The second phase is entered after presence of a label in the inspection field has been detected, and during that second phase the image of the label is positioned so that one long side of the rectangular label image is aligned with the cells 40A, B and C. The third phase is the readout, data assembly and test phase during which the image of the label is caused to travel at least once along a linear path which is colinear with that line as defined by the three cells 40A, B and C, whereby the center line of the image as extending parallelly to the long side of the rectangle, passes through the midpoint of cells D1 and D2. The third phase can be terminated at any time after readout. Between the end of the data read phase and the reestablishing of the search phase there may be a fourth or waiting phase interposed desensitizing the system for a period of time until the label which has just been read out is in fact removed from the search field.

The logic circuit 80 has as its principal function the establishing of the three different phases and to control operations, particularly image shifting operations which will lead from one phase to the next one. It can now readily be seen that the search phase is established by a situation in which neither photocell 40A through E receives a signal indicative of a fluorescent label. It was found to be sufficient if this situation is detected by absence of output signals from cells 40A, B and C. Therefore, the search phase is identified logically by $\overline{A}\,\overline{B}\,\overline{C}=1\ (=\overline{A+B+C})$.

During the search phase it is necessary for the optical equipment to be operated in such a manner that all portions of the inspection field pass periodically over at least one of the cells 40A, B and C. That field is defined by a particular position of the detection head generally and by the optical axis 15 as extending external to input element 11 and by the aperture thereof in particular. As each of the cells 40A, B and C is of small size, and since for reasons below the total length covered by the three cells, i.e., the distance from cell 40A to cell 40C is at least approximately equal to the length of the image of a rectangular label, but since, furthermore, the total area reasonably covered by the search operation is larger than that length, it is necessary to provide a scanning and search operation causing the image of the search field to undergo two motions which are transverse to each other. Modifications will be discussed below, but at the present time it is presumed that the search phase does in fact provide for two transversely directed motions of the search field image.

In the illustrated example it is assumed that logic circuit 80 forms a signal $\overline{A}\,\overline{B}\,\overline{C}$ and provides that signal to an output line. As the signal $\overline{A}\,\overline{B}\,\overline{C}$ may turn true also during a second image positioning phase, the search phase is additionally distinguished by the set state of control flip-flop 85. The signal $\overline{A}\,\overline{B}\,\overline{C}$ is passed through an "or" circuit 82 to an amplifier circuit 83 for controlling motor 19 to rotate Dove prism 17 in a particular direction and on a continuous basis. For reasons of conveniently describing the operation, this rotation will be called counterclockwise. Therefore on a continuous basis, the image of search field rotates counterclockwise across the screen 40 and the cells therein.

Additionally the image of inspection field 10 is deflected up and down, i.e., in a direction transverse to the line as defined by the three cells 40A, B and C. Motor 21 is operated by the phase signal $\overline{A}\overline{B}\overline{C}$ to oscillate mirror 20. Motor 21 has an input circuit 22 for controlling motion of mirror 20 to shift the image in one direction, for example up relative to the line 40A, B, C; there is an amplifier circuit 23 which when energized causes motor 21 to reverse so that the image is moved in down direction on the screen 40.

During the search phase but also during the second phase when signal $\overline{A}\,\overline{B}\,\overline{C}$ happens to turn true, that signal controls motor 21 directly via circuit 22 to shift the image up. However, during the search phase the set state of flip-flop 85 causes an oscillator or a pulse generator 86 to provide pulses at a particular rate, and these pulses are applied to down control circuit 33 while inhibiting control 22. There may be braking pulses of high amplitude provided to each of these amplifier circuits for rapidly effecting motor reversal in each instance.

The rate of the pulses provided by generator 86 should of course be different from the rotational speed frequency of the image as provided by Dove prism 17 so that the combined motion of up and down and rotation cannot cause a data field to circle around cells 40A, B and C. It may be advisable to have these two motions occur quite asynchronously to each other and at substantially different frequencies.

The combined up and down motion of the image and of its rotation suffices to bring a relatively large area of the search field area, on an incremental basis, in operative connection with at least one of the cells 40A, B and C. A label, even if only temporarily in or passing through search field 10, will be detected with certainty. It is, therefore, not necessary to have mirror 30 participate in this search operation though it is possible and will be described shortly.

Motor 31 is under control of a circuit 32 for pivoting mirror 30 in accordance with an image deflection to the right. The circuit 33 when energized provides correspondingly image deflection to the left along the line defined by the cells 40A, B and C. Circuits 32 and 33 are under control of a flip-flop 34 which when set causes movement to the right via circuit 32 and when reset left control circuit 33 is enabled.

A contact arm 35 or wiper represents the position of the mirror. When contacting the contact 36 the image is presumed to have rightmost position and a reset pulse is applied to flip-flop 34, for motor 31 to swing mirror 30 and the image now to the left. If arm 35 engages a contact 38, a set input signal is produced for flip-flop 34 to cause the image to reverse and to move towards the right. When the arm 35 engages the contact 37, mirror 30 has a center position wherein the optical axis 15 as traversing imaging screen 40 in fact intersects a vertical line as defined by cells 40B, 40D and 40E. During the search phase the gate 87 is enabled causing wiper arm 35 when engaging contact 37 to disable both outputs of circuits 32 and 33 so that in fact motor 31 stops and maintains mirror 30 in center position.

Centering of motor 31 is not essential but convenient. Instead motor 31 and mirror 30 may swivel back and forth. Moreover this back and forth motion can be used in the search phase in lieu of the rotational search scan. In this case however it is necessary that the up and down image movement as provided by motor 21 and mirror 20 has also different speed. For example, the repetition rate of oscillator 86 can be 5 Hz while the speed of motor 31 is selected to provide 1 Hz repetition rate for a full back and forth cycle.

Assuming that a data field enters the search field 10, one of the cells 40A, B and C will receive fluorescent light from an incremental portion of the data field label due to the search scan operation. The detected signal must be properly recognized as such by its subcarrier modulation (pulses from source 13). As a consequence of detecting a label, signal $\bar{A}\ \bar{B}\ \bar{C}$ turns false, and the output of an inverter 26 turns true to reset flip-flop 85 for terminating the search phase; the second, positioning phase commences. The object of the image positioning operation is to align one of the long sides of the rectangular data field and label image with the line as defined by cells 40A, B and C so that during the third, read phase the data filed image can move along that line and data read cells D1 and D2 will be able to read the image of the data tracks in proper orientation. Of course, the data field label image as it enters the region covered by screen 40 has usually random position and random orientation in relation to the desired position and read motion.

We consider now the individual correcting operations as they may occur in general. As soon as flip-flop 85 resets oscillator 86 is disabled or disconnected from down control circuit 23. Mirror 20 is still controlled to move in up direction in response to a signal $\bar{A}\ \bar{B}\ \bar{C}$ should it recur during the second phase, but down control will then be provided for by operation of an inverted signal $= A + B + C$, the inversion being provided by inverter 26.

It follows from the foregoing that the up and down movement of the image during the positioning and orienting phase as far as control of mirror 20 is concerned alternates between down movement as long as at least one of the cells 40A, B or C receives fluorescent reflection from the label, while the image is moved up in case none of these cells receives light. The up and down motion is strictly complementary in nature. It can be seen further, that by operation of this control alone, the label image can be oriented so that one edge thereof remains adjacent at least one of the cells 40A, 40B and 40C.

The mirror 20 may be provided with a position indicator arm (not shown) analogous to wiper arm 35 to sense certain limit positions, up and down, and when either has been reached flip-flop 85 is set again to reestablish the search phase until one of the cells 40A, B or C has again "caught" the label image.

During the search phase it was assumed that the motor 19 rotates Dove prism 17 to provide continuous rotation of the search field image in counterclockwise direction. Now, as soon as signal $\bar{A}\ \bar{B}\ \bar{C}$ turned false, this condition for counterclockwise rotation stops. It is important to note that during the second phase inputs are not always present for motor 19. Motor 19 may come to a stop for reason of absence of input signals to either control 83 and 84. That is to say, the counterclockwise control circuit 83 and the clockwise control circuit 84 do not receive signals which are the logical complements of each other. Image orientation-by-rotation, in essence, calls for an alignment of a long side of the image of the data field with a line as defined by cells 40A, B and C. If during data reading the optical input equipment as well as the label itself remain stationary to each other, there is no need at all for any corrective rotation, once the proper angular orientation has been established. Thus, once the search phase signal $\bar{A}\ \bar{B}\ \bar{C}$ has caused motor 19 to stop, counterclockwise rotation resumes or clockwise rotation will be produced only under particular conditions.

A clockwise rotation of the image will be provided by energizing circuit 84 only upon detection of a condition logically describable as $\bar{A}\ C = 1$ indicating that cell 40C does receive light but not cell 40A. This condition is an indication that, possibly, there is a misorientation, i.e., there is a non-zero angle between one side of the rectangular label and the line defined by cells 40A, B and C. Analogously then, counterclockwise rotation is produced during the second phase on condition $A\ \bar{C}$, cell 40C failing to receive light but cell 40A receiving light. However, these particular conditions for clockwise or counterclockwise rotation are not incurred immediately upon termination of the search phase because in the initial changeover from the search phase to the orienting phase undoubtedly only one of these cells will receive imaging rays which by no means is per se indicative of a need for a particular orientation. Therefore either rotation is now conditioned upon the additional condition $\bar{B}\ D$ which means that as a whole the label image must be below the line as defined by cells 40A, B and C, and it must be in fact so low that the cell 40B does not receive light while cell 40D does.

One can therefore see that condition $\bar{A}\ \bar{B}\ C\ D$ is true only if the one side of the rectangle is somewhat tilted relative to the line defined by cells 40A, B and C, and if the image as a whole is already in or near a correct position, but requires merely a slight clockwise rotation. The tilt is in the opposite direction when $A\ \bar{B}\ \bar{C}\ D$ turns true, requiring a slight corrective rotation in counterclockwise direction. The logic circuit 80 thus includes gates 88 and 89 respectively establishing these condition. The output of gate 89, realizing the logic function $\bar{A}\ \bar{B}\ C\ D$ provides the sole input for the clockwise rotation control circuit 84. "And" gate 88 realizes the second condition for counterclockwise rotation, which condition is $A\ \bar{B}\ \bar{C}\ D$ and provides a second alternative input for the "or" gate 82.

It has to be observed that for example $\bar{A}$ and $\bar{C}$ can be true whenever the short side of the rectangle is aligned with the line established by the three cells 40A, B and C, so that the image is misaligned by 90°, without establishing per se one of the conditions for corrective rotation. Nevertheless, for reasons of back and forth motion which will be described shortly, the 90° tilted image of the data field will invariably pass over cell 40E having position below cell 40B and at a distance which is larger than the width of the data field image but shorter than the long side of the rectangle of the data field label. For this reason, the condition $E\ \bar{C}$ is detected and a corresponding signal is formed in logic circuit 80. $E\ \bar{C}$ when true produces a third alternative input for gate 82 so that a counterclockwise realigning rotation is induced and continued until the long side of the rectangle is aligned with the line defined by cells 40A, B and C. It is quite arbitrary whether corrective rotation at that point is carried out clockwise or counterclockwise. Therefore one could use readily a signal $\bar{A}$ E to cause the image to rotate clockwise via circuit 84.

As a result of the combined motion of motors 21 and 19, the rectangular image is positioned to have its long side aligned with the line of cells 40A, B and C, but the image may be off center, to the left or to the right so that $\bar{D} = 1$. However, the control for motor 31 has to be considered next, as its control produces the back and forth image motion which, in turn, makes sure that during the corrective image orienting operation, the condition $D = 1$ is established at least temporarily.

As soon as the search phase was terminated gate 87 turned false, and motor 31 begans to run in dependence upon the state of flip-flop 34. That state may be quite arbitrary at that time as it is basically unimportant whether the back and forth motion commences with image movement to the left or to the right. Logic circuit 80 now generates logic signals A $\bar{D}$ and C $\bar{D}$ operating as substitutes for controlling the reversing of motor 31. In essence, the width of a range for return control as defined by these signals is given by the maximum dimension of the label image in direction of the cells 40A, B, C, and that range is, of course, shorter than defined by these contacts 36 and 38. The signal A $\bar{D}$ is used in particular as an alternative set input for flip-flop 34 causing motor 21 to pivot mirror 30 corresponding to an image deflection towards the right, while the signal C $\bar{D}$ is an alternative reset input for flip-flop 34 for controlling 33 to cause motor 31 and mirror 30 to shift the label image to the left.

Figure 3:
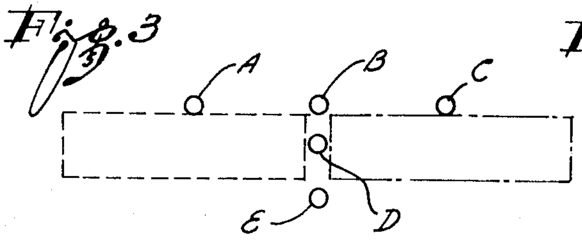
FIG. 3 illustrates schematically the relationship between a data field image and detector cells in limit positions of the image during operation.
Figure 4:
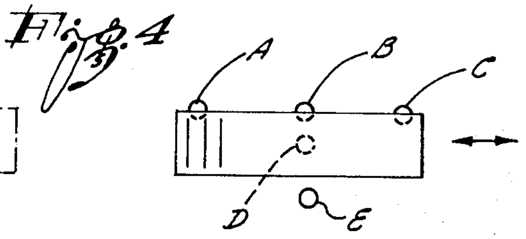
FIG. 4 illustrates another, intermediate relative position between a data field image and detector cells for image field recognition.

It can readily be seen that by operation of the alternation in the signals A $\bar{D}$ and C $\bar{D}$ a rectangular label image pivots back and forth, and since the direction is colinear with the line of cells 40A, B and C, the data field image moves in between the two positions illustrated in FIG. 3. The dashed position in FIG. 3 shows the image at a time a left swing is stopped because A $\bar{D}$ turns true, causing flip-flop 34 to set and motor 31 reverses to swing the image to the right. Analogously, the dash dot line in FIG. 3 illustrates the other extreme position causing reversal of motion from right to left. The data field image is caused to oscillate between the two positions shown in dash and dash dot lines in FIG. 3, and in a direction which is (a) colinear or parallel to the line of cells 40A, B, C, (b) parallel to the long side of the rectangle, (c) parallel to the extension of the track images.

The label in field 10 may be rather remote from the optical axis 15 so that the unoriented label image is rather displaced from the screen center which is on the line defined by cells 40B, D and E. The sweep width as defined by the angle or distance between contacts 36 and 38 with reference to axis of arm 35 is however wide enough so that the label image can be shifted underneath and along that line defined by cells 40A, B and C.

It must now be considered that it is not necessary to provide a particular stationary position of the label or data field image relative to the various cells. The data field image should move in relation to the data track cells D1 and D2 so that the data fields can be read. This motion is produced by motor 31 on a reciprocating basis. For this, the image does not have to swing back and forth over the same range which has been used during search scan. The seep range needs to be wide enough only so that the entire length of the data track image will pass across read cells D1 and D2. This is the reason for choosing the signal $\bar{D}$ as criterium. $\bar{D}$ turns true upon D ⟶ $\bar{D}$ and that occurs when the trailing edge of the label image has just passed cell D. That change of D to $\bar{D}$ is used for back and forth sweep, after termination of the first, search phase.

If the image is somewhat too low, the condition $\bar{A} = 1$ may occur, but the up control will soon reestablish $A = 1$, because, if the image is also to the left, $\bar{B} = \bar{C} = 1$ and $\bar{A}\ \bar{B}\ \bar{C} = 1$ is the condition for up control in all phases. Thus, A $\bar{D}$ may not immediately turn true with D ⟶ $\bar{D}$ so that the image swings somewhat more to the left but concurrently the up control will establish the desired position and A $\bar{D}$ will turn true to trigger the reversal of the back and forth motion of the image. The same is true for reversing the image motion in the other direction on C $\bar{D}$. = 1.

As a consequence of this back and forth motion the image of the data field tracks pass completely underneath the two data readout cells D1 and D2 during one pass in one direction at proper orientation for data readout. A long side of the rectangle is particularly aligned with the line of cells 40A, B and C when the upper image side is approximately on that line, running through the centers of these cells, while cell 40E does not receive light during the back and forth image motion. Should the image locate somewhat below the line, a low level threshold in the detectors establishes a no-light-output, and when somewhat above that line the threshold response establishes the light-output state of each cell and corrective motion is introduced as aforedescribed.

It is optional at what point the third phase is entered, i.e., when readout proper is initiated. In the above identified copending application Ser. No. 818,030 filed Apr. 21, 1969, circuitry is disclosed adapted to test a particular format for encoding of data if such a format has been used on a label. That application discloses also test circuitry which tests on a continuous basis legality of the characters that have been read out during the reasing process. Detection of an illegal character causes erasure of any prior readout and the circuit is prepared for another readout process, i.e., for a repetition of reading. The principle of testing and repeating readout until the data read have passed the tests is employed here; specific aspects relevant to testing upon oscillating readout will be described below. Testing characters immediately after they have been readout in effect means that the readout circuit can be operative at all times, including the entire period of the positioning and orienting phase the output signals derived from cells D1 and D2 must lead to illegal characters as long as the label image is not properly oriented.

The AC processing of the readout signals in circuits 41 and 42 respectively as connected to cells D1 and D2 discriminate against light from any other source failing to have subcarrier modulation. Detailed reflections at subcarrier modulation include in particular strong contrasts and corresponding signal level changes, when dark marker bits alternate with bright label background imaged onto and passing across cells D1 and D2. Inputs are thus produced as soon as the data field enters the search field and passes under cells D1 and D2. However, proper data cannot be produced until the label image oscillates back and forth along the line of photocells 40A, B and C, i.e., in the proper aligned position.

The circuit included in the drawing of FIG. 1 is instrumental in considering a particular aspect of the rectangular data field, particularly because data readout is deemed legal in either direction of motion of the data field image along the line defined by cells 40A, B and C. It should be realized that the image of the data field can be aligned and can assume proper aligned position in two different ways. The rectangle has two long sides, and each one can be aligned with the cells 40A, B and C in juxtaposition therewith. These two positions are shown in FIGS. 5A and 5B. One can consider the position of the image field as being right side up when the control character or gap used as leading character is at the left. In this orientation data will be read in direct sequence if read during movement of the data field image from left to right, whereby cell D1 reads the upper track X and cell D2 reads the lower track Y, and using the illustrated position of FIG. 5A as starting position. It is however never certain that the label has in fact that position; instead it may be upside down as shown in FIG. 5B. In this case the direct reading sequence would be during movement from right to left, and upon reversal of output connection of cells D1 and D2 for proper character assembly. (See the track designation.) The proper overall association must thus be established.

Cell D1 reads the X track when the label image is right side, up but it reads the Y track when the label is upside down. Cell D2 reads the respective other track in each case. Cells D1 and D2 read the (assumed leading) control character first when the label image is right side up and moves from left to right, or when the label image is upside down and moves from right to left.

The circuit shown in FIG. 1 establishes proper association between track orientation, control character, read cells D1 and D2 and outputs thereof. The association of these components is selected so that data can be read and properly assembled when the image moves in either direction. An "and/or" gate assembly 51 provides two output lines 52 and 53 respectively feeding signals into a test circuit 60 which includes appropriate assembly registers. The logic circuit 51 is designed in such a manner that line 52 receives signals, from cell D1 when the data field image moves from left to right, while line 52 receives signals from cell D2 when the image moves from right to left. Line 53 receives signals from cell D2 when the image moves from left to right, and from D1 in the reverse case. In order to control directional distinction the outputs of flip-flop 34 can be used to provide the necessary gating signals. The state of flip-flop 34 can be used generally and is so being used as indicator for the current direction of movement of the label or data field image. This way it is possible to make the following unambiguous association.

If during the readout process the control character precedes the data, line 52 receives the upper, X track and line 53 receives the data read from the lower Y track. This is true regardless of the direction of reading and results solely from the reversal of connection as between the lines 52 and 53 on the one hand and the cells D1 and D2 on the other hand by operation of the switching logic circuit 51. If now reading occurs with a control character appearing first while the label swings from left to right when the label image is in fact right side up (FIG. 5A). If the control character leads during reading from right to left the label image is upside down (FIG. 5B). If the control character succeeds the data the situation is reversed.

It follows from the foregoing, if lines 52 and 53 receive the control character first, independent of the direction of reading and of label image motion, the data are presented in proper order. If the lines 52 and 53 receive the control character last, again regardless of the direction of reading at that time, the data are presented in the reverse order. Circuit 60 generally is provided to process the data so that they can be properly assembled. That circuit can be similar to the circuit for processing of read signals as shown in said copending application Ser. No. 818,030. In that application equipment is disclosed requiring gap detection before a readout processing sequence can commence. Control character detection of course is analogous to gap detection. Moreover, the circuit provides particular character check which will result in error detection if the characters are presented in reverse order of the several bits. To that extent that application may be incorporated by reference into this present system, restricting testing and decoding to those situations where the leading character or gap precedes data proper, discarding other cases. However, the circuit shown in FIGS. 5, 6 and 7 illustrates a somewhat modified version for readout processing and character decoding and testing and to this we now turn.

FIG. 5 illustrates a somewhat simplified circuit which includes the data read cells D1 and D2, and the respective AC processor and subcarrier discriminators and demodulators 41 and 42 providing digital signals representing the marker bits (or absence thereof). The signals run through the gate a switching circuit 51 so that the output of lines 52 and 53 receive signals alternatingly by cells D1 and D2. The lines 52 and 53 may receive the digital signals in proper order or in the reverse order, and either case is independent from the direction of the oscillatory label image movement at any instant as was outlined above. These signals are now applied to shift registers 61X and 61Y in the order of presentation.

If in fact the control character precedes the data proper, line 52 sets the bits read from track X into register 61X while line 53 sets the bits read from track Y into register 61Y regardless of the direction of label image movement, as the label image may be right side up or upside down. The data are shifted into the registers which have end stages 62 and after the entire label image has passed the detector cells D1 and D2, these end stages hold the control character at the time of image motion reversal as controlled by a change of state of flip-flop 34 causing motor 31 to reverse direction.

A detector 63 is coupled to stages 62 and monitors presence or absence of the control character at that time. In case the control character is not in stages 62 at that time, the control character did not precede the data, and the content of register 61 is erased whereby the signal flank $\overline{D} \longrightarrow D$ is used for erasing. This instant actually precedes another run of the image in the reverse direction during which period the data field image is read again, and at the end of that run the control character can be expected to be in stages 62. If not, the reading is repeated as apparently the label image is not yet properly oriented. The data could now be shifted out of register 61 (or circulated therein), tested and discarded if faulty or transferred if corrected and actually the operation could terminate at that point. However, if a three-out-of -six or a four-out-of-six encoding format is used as explained in the above identified application Ser. No. 818,030, bidirectional reading is admissible. This is particularly so because a slight tilting of the image during reading can in cases simulate a legal but incorrect character.

There is provided a second set of registers, 64X and 64Y, also called the reverse registers 64. Data are shifted into the reverse register 64 from the lines 52 and 53 concurrently with loading of registers 61. A testing circuit 66 tests the end stages 65 of registers 64 at the end of the run whether it contains a legal character other than the control character. If that is the case the data have been shifted in the reverse order into register 64; if not, they are erased, and read and shifted again into the registers during the reverse run of the data field image.

It follows that as soon as the label image has the proper alignment position and at the latest a full back and forth motion cycle thereafter register 61 holds the data with control character farthest into the register while registers 64 hold the data in the reverse order. This condition is monitored by coincidence gate 67 determining that at the end of the run both test circuits 63 and 66 provide nonerase conditions for the respectively associated registers they supervise. This terminates a precheck phase. During the precheck phase data are read generally, and are assembled by making certain that registers 61 hold the data after a reading in the regular direction, while registers 64 hold data that have been read in the reverse.

The precheck phase may actually be carried out on a continuous basis during the aligning phase as it can be expected that as long as the label image is not properly aligned, the precheck will already lead to an incorrect readout situation and this, in turn, leads to repeated erasing. The main check phase begins after the precheck has been successfully completed, i.e., after data have been read in two oppositely directed runs of a full image motion cycle. Successful completion of the precheck phase does not necessarily mean that the data have been read correctly as track characters corrective substitute reading may have to be carried out in the main check phase. It is particularly important and should be emphasized that the data are now held in duplicate in different registers, but they differ as to orientation one set of data has been read in one direction and the other one in the other direction.

Now the principal or main test is carried out. As schematically shown in FIG. 6, the two registers 61 and 64 are operated as recycling buffers but at differing cycle rates, the cycle rates being related at a ratio equal to the number of data characters in a data field. The control character detector 63 and a control character detector 68 at register 64 operate a synchronizing circuit 69 controlling the phase of an oscillator 70 so as to establish proper phase relationship between the two circulating registers. A frequency reduction stage 74 is coupled to the oscillator 70 to provide the then rate shift pulses.

It will be recalled that the data characters are held in two registers 61 and 64 in different order so that they circulate forward in the register 61 but reverse in register 64. The difference in circulating speed and the phase difference because of the additional control character results in a precession as to which characters are presented at the beginning of each new character period as shifted into the end stage of the slow circulating buffer. There is a corresponding character in the end stage of the fast circulating buffer so that the two can be meaningfully compared as to identity.

The description of the system above is not tied to any particular character format, nor even to any particular number of tracks as long as one end of the data field is sufficiently identified.

The following more detailed description, with particular reference to FIG. 7, assumes that each character has six bits, three bits serially in each track to define three, two-bit subcharacters. The control character may have "1's" (markers) in each of its six position. The circuit shown in FIG. 7 is particularly intended as an enlargement of the illustration of register assembly 61, but there is a similar configuration of registers 64 as can be readily deduced.

The bits in each character are presented in pairs, one from each track, and one in each line 52 and 53, with three sequential bits in each line per character. Moreover, the condition may exist that there is at least one "1" bit per character, so that an OR'd clock signal is derived directly from detector output processing circuits 41 and 42. The register 61X is divided into three parallel operating registers 61X1, 61X2, 61X3; and register 61Y has, likewise, three parallel operating subregisters 61Y1, 61Y2, and 61Y3, each of them strictly operating in serial-by-bit format, with the number of bit positions equal to the number of characters in a data field.

The input and loading circuit for the registers included in register assembly 61 comprises a recycling, three bit shift register counter 72; three distributor gate 73 operate in response to the OR'd clock. These gates cause three sequential bits in line 52 to be set sequentially into the three registers 61X1, 61X2 and 61X3. Each bit thus recycles in a different register. The counter 72 defines, in effect, the position order of a bit in each character, and a full cycle of the counter represents the complete character. The gate assembly 73 operates in parallel thereto and in response to the same control state of counter 72 to set three sequential bits from line 53 respectively into the three registers 61Y1, 61Y2 and 61Y3.

It appears, therefore, that after three bit-clock pulses, six parallel stages, one in each of the six registers 61X1, 61X2, 61X3, 61Y1, 61Y2, 61Y3, hold all six bits of a character, in parallel. These bits may be shifted into the first stage in each register as counter 73 recites, presenting all bits of a character in a parallel format to the testing devices facilitates testing, as the six bits will be tested in parallel. After a complete label image run, all data are held in the six registers, each register holding one bit per character and the bits of the same character held in parallel in corresponding stages. The six end stages 62 are coupled to the various test circuits, but they are also coupled to the respective inputs of the registers, for providing recycling, even during testing.

The following should be interjected here. Each of the six registers may actually recycle its content on a continuous basis, i.e., already during loading, so that there is a shift rate of bit propagation within each register which is in the upper kilocycle or even in the megacycle range, the recycle rate of each register being in the kilocycle range, or even higher, depending upon the number of characters in the data field. The bit presentation (read speed) is below the kilocycle range, so that for each new bit as presented for loading the proper place in the recycling order will soon arrive, as frequency of loading and recycling — shifting rates are several orders of magnitude apart. There can be a common tracking circuit for detecting the respective vacant input positions of all the recycling registers involved.

The main test phase, for example, includes two tests, a format test and a character comparison test. These tests are conducted actually in the brief time span during reversal of the image motion, after coincidence circuit 67 has responded to the condition that all registers have been properly loaded. Again, this should be time-gated on $D \longrightarrow \overline{D}$. If the number of characters is in the order of 10 and if the faster registers have a shift rate in the megacycle range, then the slower one of the two register systems has a recycle rate of about 10 kilocycles, assuming the recycling ratio being in the order of 10. If the oscillatory image motion has a cycle rate in the order of 1 or a few cycles per second, then the bit reading rate is below 100 Hertz; thus all tests can be completed in about one-tenth of a millisecond which amply suffices whether or not during the new ensuing run, data must be read again. Specifically the tests can be conducted from the time $D \longrightarrow \overline{D}$ triggers reversal of motor 31 until after completed reversal $\overline{D} \longrightarrow D$ signals reentering of the label image in the range of detector 40D.

Depending upon the chosen format, for example, a "4-in-6-bit-position" test is performed by an appropriate gate and comparator circuit 75, and is carried out on an intermittent basis for each six bits as passing through end stages 62 for recirculation, and only after character control monitor 63 has responded.

The control character monitor 63 may include a simple six-input "AND" gate coupled to six end stages 62 of registers 61. The output of monitor 63 must be time-dated appropriately by the pulses $A\overline{D}+C\overline{D}$, (upon $D \rightarrow \overline{D}$) used for reversing control of data field image motion. $D \longrightarrow \overline{D}$ occurs when the label image leaves cell 40 D.

The test circuit 66, introduced above, conducts a similar format test on the reversely read and circulating data in register 64. The last test performed must necessarily lead to an illegal character when the control character appears. However, this will not lead to an error situation as will become apparent below.

Concurrently with the format test, there is a bit-for-bit comparison made by a comparator 76 which compares the bits held in end stages 62 with the concurrently presented six bits from the end stages of the six registers included in assembly 64. As was mentioned above, the two register systems 61 and 64 have different cycle rates, the fast one recycling once per one step shift in the slow one. A phase shift between them causes a character precession so that, for example, immediately after each shift in the slow one of the two register assemblies, similar characters are the respective output stages of the two register assemblies, to be compared bit-for-bit and in parallel in comparator assembly 76.

The synchronizing control 69 further operates so that the last characters to be compared are (or should be) the control character. At that point, device 66 tends to signal error, and so will device 75, but control character detectors 63 and 68 respond likewise so that this overall coincidence of responses can be used to terminate the main check phase, provided any of the previously conducted tests did not lead to error situations.

Any response by format testing device 75 prior to response to the "illegal" control character as phased from synchronizer 69 causes an error indicator 77 to be set. There is an analogous error indicator for the result of the test conducted by format testing device 66 on the content of registers 64. Erasure of the content in register 61 is controlled in response to the state of error indicator 77, and erasure of the content in registers 64 is controlled analogously. When the indicators signal error, by the time after a reversal of image motion $\overline{D} \rightarrow D$, erasure results. $\overline{D} \longrightarrow D$ occurs when after image reversal the label image again enters the range of detector 40D.

The rules for register content erasure control to be triggered by an error detection circuit 77 and by the one responding to error detection in the content of registers 64 as follows. If the 4-out-of-6 test, as conducted by device 75, discovers an error, register 61 is erased and reloaded during the immediately succeeding run, or during the next run thereafter because either register assembly can be properly loaded only during one particular direction of label image movement, which in turn depends on the orientation of the label and of the image position at the time of error detection. A concurrent error detection response of comparator 76 is actually disregarded at that time. If the 4-out-of-6 test conducted parallelly on the output of registers 64 results in an error, these registers are reset and reloaded analogously.

When testing of the content of both register assemblies leads to one or more errors in the 4-out-of-6 test, then all of the registers are erased, and the entire reading process is started anew. This is what actually will happen during orientation and positioning of the label image, if accidentally and because of a peculiar set of coincidences, the data passed the precheck while the label image was not yet completely oriented.

If the 4-out-of-6 tests find no errors, but if there is a bit-by-bit comparison error, only one of the register assemblies 61 or 64 is erased, namely, the one which was not the last one that was loaded. In other words, after a full cycle, at the end of precheck and after the immediately following main check phase has been completed, but actually before the new run begins upon reversal of label image motion, then an attempt is made to immediately reload that register which in effect can be loaded during that now ensuring run, as the other registers were loaded during the preceding run. The selection is made in a circuit 79 which responds, 1. to an error detection by comparator 76 and, 2. to the sequence of response of devices 63 and 66 during the precheck phase, (response of 66 limited to D ⟶ $\overline{D}$ phasing) to associate that action of motion with the loading sequence. If during the precheck phase control character detector 63 responded after reverse registers 64 had been loaded already (signalling completion of loading all registers), the contents of registers 64 will be erased upon detection of a comparator error. If register 64 was not loaded by the time control character detector 63 responded, registers 61 were first to be loaded, and their content will be erased upon comparison error detection.

Data that are now being erased by this operation are not necessarily the ones that cause the comparison error, but there is a 50 percent chance that they did include the erroneous read result, and by observing this selection rule, time is saved as in about 50 percent of all arising comparison error cases it can be expected that in fact the error can be corrected by reloading those registers immediately, which can be loaded; now the image has proper direction for reading and register loading as associated with the label orientation in the particular situation. If the register erased was not the one which caused the error, the other registers can be erased and will be erased after the next reversal for reloading during the run following that reversal.

Erasure control can actually be conducted by providing an enabling control for the loading gates 71 and 73 or the ones in input circuit for register assembly 64, by the time $\overline{D}$ ⟶ D which occurs at the beginning of the reverse image run, after reversal. That enabling is maintained during that run. This enabling control is provided by a circuit 90. Reloading the register assembly may serve directly as erasure of prior content.

If after a reversal, and upon $\overline{D}$ ⟶ D, there is no error, the end-of-read signal EOR may be produced, to reset the various components and to control the transfer of the data held in either register system, 61 or 64, to an evaluating and final re-encoding and recording circuit.

Upon occurrence of signal EOR, a set of gates 96 are controlled open, for example, for causing the data as sequentially set into the end stages 62 of registers 61 to be set into a decoder 95. The decoded characters are set into a recorder 97 or into any other suitable device. An error may be detected in the decoding process; for example, a six-bit character even though legal as to format, may have passed also the comparison test, but the character is not associated with a particular encoding set of bits. Now there may be provided occasion to repeat the entire process, or an error character may be printed, because the reading process may well have been a correct one, but the information on the label itself was not correct. In the latter case, even repeated reading cannot possibly lead to errorless decoding.

The signal EOR or a signal indicating completion of decoding can be used to trigger an indicator or the like to provide control for appropriate automatic equipment so that the data field may be removed from the search field 10. If there is a continuous motion for transporting data through the search field, the tracking control as continuously provided by operations of the various feedback circuits and having the signals A,B,C,D and E as inputs, soon will reach operational limits, which is an indication that the data field is about to leave the operating and detecting range. Subsequently, the search phase is established in which the system operates under condition $\overline{A} \cdot \overline{B} \cdot \overline{C} = 1$, and normal search scan operation is resumed until the next data label is found.

A different mode of operation without bidirectional readout is the following and does not require separate illustration but can be readily understood from the drawing. Only half of the gate assembly 51 as connected between the cells D1 and D2 and lines 52 and 53 and registers 64 with connecting circuitry, including the comparator tester 76, are omitted. Now, there is a particular fixed association between cells D1 and D2, on one hand, and registers 61 on the other hand; readout being possible only during one particular direction of motion of the data field.

It can readily be seen that again the condition must exist that the control character has to precede data in order to obtain proper readout. Otherwise, the characters are not properly assembled. That situation cannot possibly occur if the label is oriented upside-down and control character detection will necessarily result in subsequent decoding errors if the label is in fact upside-down. Thus, the decode error detection during the main phase, in this case, can be used as an alternative input to rotational control overriding temporarily all other inputs for rotational control to cause, in effect, a rotation of the data field at least somewhat in excess of 90°. Thereafter, normal positioning control takes over to reorient the label image exactly, now in right side up position and in alignment with cells 40A, B, C. Subsequently, reading and testing will occur as aforedescribed.

Turning now to FIG. 8, there is illustrated, a particular arrangement which, in effect, permits enlargement of the scanning area or search field area in direction of the line to be aligned with the long side of the rectangular label image. Additional detectors are provided and a first plurality thereof is OR'd together to form the logic signal A and a second plurality is OR'd together to form the logic signal C. One can readily see that detection of data field label spans a larger area but the control conditions outlined above remain the same particularly for homing the image label into the reading position.

The arrangement illustrated in FIG. 8 has the additional advantage that subsequent to a homing operation the image cannot escape, even if the label moves through field 10. Should for any reason the image be pivoted too far to the left or to the right the extended detecting range will still cover a sufficiently large area to detect a data field image and to place it back into homing position.

The invention is not limited to the embodiments described above, but all changes and modifications thereof not constituting departures from the spirit and scope of the invention are intended to be covered by the following claims.

I claim:

1. In a device for reading information in a data field having at least one straight marker track and including a recognition marking with a straight contrasting edge extending parallel to the track in particular relation thereto, the data field having random position and/or random orientation when presented for reading in a particular area, the combination comprising:

data reading means disposed for reading information as recorded in the track of a data field;

first means positioned in relation to the particular area and producing an image of at least a portion of the particular area, including an image of a marker track and an image of a recognition marking of a data field when in the portion of the particular area;

second means disposed in relation to the first means and responsive to position of the images of the recognition marking and of the marker track in relation to the data reading means and including detector means arranged along a straight line;

third means operated by the second means and controlling the first means to adjust the relative position of the data reading means and of the image of the recognition marking, and including means (a) to provide a rotational adjustment and means (b) for providing lateral shift so that the image of the contrasting edge of the recognition marking extends along said straight line, parallel to a line through the data reading means, further including means operated by the second means and controlling the means (b) for the first means to provide a linear reversing relative displacement between the data track image and the data reading means along said line, colinear with the extension of the track image; means (c)

first circuit means connected to the data reading means for processing readout signals as provided by the data reading means during relative movement between track image and data reading means under control of the means, (c); and second means connected to the first circuit means to test the validity of the data read, and to control repetition of data reading by the data reading means due to repeated passes of the data field image across the data reading means by operation of directional reversal as controlled by the means (c).

2. In a device as set forth in claim 1, at least one of the means (a), (b) and means (c) operating to provide oscillating movement of the image of the portion of the particular area relative to the second means and respectively transverse to and/or along said lines prior to detection of a recognition marking image by the second means.

3. In a device as in claim 2, the means (a) providing continuous rotation of the image of the portion of the particular area across the second means prior to detection of the recognition marking image by the second means.

4. In a device as in claim 1, the third means providing search motion to progressively couple the image of the particular area to the second means for detection of absence and presence of a data field therein.

5. In a device as in claim 4, the means (a) providing continuous rotational image sweep and oscillating lateral motion to detect the absence or presence of a data field in the particular area.

6. In a device as in claim 4, the third means providing continuous lateral motion between the second means and the image of the particular area by operation of the means (b) and providing continuous transverse motion by operation of the means (c) at different frequencies.

7. In a device as in claim 1, the means (c) operating to cause relative oscillation of the data field image across the data reading means to obtain bidirectional readout.

8. In a device as in claim 7, the circuit means including first and second register means respectively for storing the readout signals separately for the two different directions of movement of the data field image across the data reading means.

9. In a device as in claim 8, the circuit means including data test means, and means for shifting the contents of the first and second register means in the same direction at different shift speeds so that comparable information characters appear at the end of each register to be compared in the test means as to agreement.

10. In a device as in claim 7, the recognition marking additionally identifying the approximate end of the track, the second means operating to restrict the oscillating amplitude to the approximate length of the track image.

11. In a device as in claim 1, the data field having particular marking identifying the direction of data recording on the track, the circuit means including circuit means(a) responsive to signals representing the distinguishing marking to obtain a correctly assembled data sequence.

12. In a device as in claim 11, the means (c) providing bidirectional oscillation between data track image and data read means, the circuit means including shift register means coupled to the data read means, the circuit means further including circuit means (b) connected to the farthest end of the shift register means to test presence of absence of signals representing the distinguishing marking.

13. In a device as in claim 12, the circuit means including second register means coupled to the data read means, and circuit means (c) connected to the farthest end of the second shift register means to detect absence or presence of the signals representing the distinguishing marking, to obtain read results in the two register means pursuant to reading in both directions.

14. In a device as in claim 1, the data field including at least two tracks, the data read means including correspondingly two read detectors, the circuit means including registers for separately receiving the read signals from the detectors, further including means to alternate the connection between the registers and the detectors in dependence upon the direction of motion as provided by the means (c).

15. In combination for reading, from a data carrier movable along a conveyor line, information in a data field having data markings for selectively identifying the data carrier and where the direction of disposition of data in the data field is identified by a straight recognition marking extending as a constrasting line along the data field and having length larger than the individual data marking on the data field:

means for identifying data in the particular field;

first means defining an optical path between the identifying means and a particular area along the conveyor line to optically relate the area, including the data field therein, to the identifying means;

recognition means included in the optical path and responsive to the recognition marking for providing signals in accordance with the optical disposition of the recognition means relative to the recognition marking, and including a plurality of individual detectors arranged spaced-apart and along a straight line;

second means responsive to the signals produced by the recognition means for adjusting the disposition of the recognition means relative to the recognition marking to provide and maintain a particular disposition between the recognition means and the recognition marking, wherein the recognition marking as optically related, extends along said line, the second means including means to provide selective rotational adjustment of the optical relationship between the recognition means and the recognition marking so that the direction as optically related is colinear with the particular line as defined by the detectors of the recognition means;

third means responsive to the signal produced by the recognition means for providing a linear, oscillatory relative displacement between the identifying means and the recognition means, on the one hand, and the recognition marking on the other hand, and along said line the displacement being effective along said direction colinear with said line as optically related by the first means, the identifying means operating for identifying data in the particular data field as optically related to the identifying means during said linear displacement.

16. The combination as in claim 15, the recognition marking defining additionally the approximate length of the data field, the third means operating to restrict the linear displacement to a distance similar to the length as optically related by the first means.

17. The combination as in claim 15, the recognition means including a detector outside of said line for particularly controlling the rotational adjustment.

18. In combination for reading from a data carrier in a data field selectively identifying the data carrier, where the data field is identified by a recognition marking and is disposed in substantially rectangular boundaries:

means for identifying information in the data field;

first means defining an optical path between the identifying means and a particular area to optically relate the area, including the data field therein, to the identifying means;

recognition means included in the optical path and responsive to the recognition marking and including a plurality of detectors arranged along a line, and an additional detector positioned in relation to said line but outside of that line and at a distance therefrom smaller than the long side of the rectangular data field but larger than the small side thereof and as optically related by the first means;

second means for providing an adjustment of the optical relationship between the recognition marking and the first means to obtain a particular relationship in accordance with the relative characteristics of the signals produced on the recognition means by the recognition marking, the particular relationship defined by alignment of one long side of the rectangular boundaries with the line of the detectors, and including rotational adjustment in particular response to the additional detector;

third means operating in response to the recognition means for providing a linear displacement of the optical relationship between the recognition means and the recognition marking along said line to obtain corresponding colinear displacement of the optical relationship between the identifying means and the data field; and fourth means connected to the identifying means for recovering the information selectively disposed in the data field on the data carrier during the linear movement of the optically related data field and identifying means.

19. The combination as in claim 18, the data field defined by a plurality of data tracks, the identifying means comprising a corresponding plurality of read detectors, the fourth means including means responsive to signals provided by the read detectors to distinguish direction of data field reading, the third means providing oscillatory linear displacement.

20. The combination as in claim 18, the recognition means including a plurality of detectors arranged along a line, and an additional detector disposed adjacent said line but outside thereof and at a distance therefrom smaller than the small side of the rectangular data field as optically related by the first means, the third means providing oscillatory displacement of the optical relationship between the recognition means and the recognition marking along said line of detectOrs and between positions as defined when one or the other small side of the rectangle as optically related by the first means is about tangent with the additional detector.

21. The combination as in claim 18, the fourth means including means to derive from the signals as provided by the identifying means, representation of the data field orientation, and to provide for particular control of repetition of reading.

22. A combination as set forth in claim 21, the reading being repeated during linear displacement of the optical relationship between the recognition means and the recognition marking as well as the data field, in opposite direction as compared with previous direction.

23. The combination as set forth in claim 21, and including means to reorient the data field as optically related by the first means to the recognition means and the identifying means, to obtain repetition of reading in relatively opposite direction as compared to the direction or reading prior to the reorienting step.

24. In a device for reading information in a data field having at least one marker track and including a recognition marking extending parallel to the track in particular relation thereto, the data field having random position and/or random orientation when presented for reading in a particular area, the combination comprising:

data reading means disposed for reading information as recorded in the track of a data field;

first means positioned in relation to the particular area and producing an image of at least a portion of the particular area, including an image of a marker track and an image of a recognition marking of a data field when in the portion of the particular area;

second means disposed in relation to the first means and response to position of the images of the recognition marking and of the marker track in relation to the data reading means;

third means operated by the second means and controlling the first means to adjust the relative position of the data reading means and of the image of the recognition marking, and including forth means to provide a rotational adjustment and lateral shift so that the image of the recognition marking extends colinear with or parallel to a line through the data reading means, further including fifth means operated by the second means and controlling the first means to provide a linear, reversing, relative displacement between the data track image and the data reading means colinear with the extension of the track image and of the recognition marking image along said line;

circuit means connected to the data reading means for processing readout signals as provided by the data reading means during relative movement and in opposite directions between track image and data reading means under control of the fifth means, the circuit means including first and second register means respectively for storing the readout signals separately for the two different directions of movement of the data field image across the data reading means; and data test means included in the circuit means, and there being means for shifting the contents of the first and second register means in the same direction at different shift speeds so that comparable information characters appear at the end of each register to be compared in the test means as to agreement.

* * * * *